United States Patent
Lee et al.

(10) Patent No.: US 6,188,509 B1
(45) Date of Patent: Feb. 13, 2001

(54) SIMPLE BIDIRECTIONAL ADD/DROP AMPLIFIER MODULE BASED ON A SINGLE MULTIPLEXER

(75) Inventors: Chang Hee Lee; Yun Chur Chung, both of Taejun; Chul Han Kim, KyoungKi-do, all of (KR)

(73) Assignee: Korea Advanced Institute Science and Technology, Taejun (KR)

( * ) Notice: Under 35 U.S.C. 154(b), the term of this patent shall be extended for 0 days.

(21) Appl. No.: 09/224,774

(22) Filed: Jan. 4, 1998

(30) Foreign Application Priority Data

Jan. 5, 1997 (KR) .......................................... 98-63

(51) Int. Cl.[7] .................................................. H01S 03/00

(52) U.S. Cl. .............................. 359/341; 359/124; 385/17

(58) Field of Search ..................................... 359/124, 127, 359/110, 179, 341; 385/17

(56) References Cited

U.S. PATENT DOCUMENTS

| | | | |
|---|---|---|---|
| 5,633,741 | * 5/1997 | Giles | 359/124 |
| 5,740,289 | * 4/1998 | Glance | 385/24 |
| 5,801,879 | * 9/1998 | Burton et al. | 359/341 |
| 5,926,590 | * 7/1999 | Mao | 385/24 |
| 5,995,259 | * 11/1999 | Meli et al. | 359/134 |

FOREIGN PATENT DOCUMENTS

WO 99/65164 * 12/1999 (WO).

* cited by examiner

Primary Examiner—Mark Hellner
(74) Attorney, Agent, or Firm—Akin, Gump, Strauss, Hauer & Feld, L.L.P.

(57) ABSTRACT

This invention is to construct a bidirectional WDM add/drop amplifier module for transmitting WDMS in bidirection and for adding/dropping a signal in bidirection at each node in a WDM network system using a single N×N multiplexer. The bidirectional WDM add/drop amplifier module 100 comprises an 8×8 arrayed-waveguide grating 110. The 8×8 arrayed-waveguide grating 110 has, at each side, a WDMS input end L4 or R4, a WDMS output end L8 or R8, three separated signal input ends L1, L2 and L3, or R5, R6 and R7, and three separated signal output ends L5, L6 and L7, or R1, R2 and R3. One L2 or R6 of the separated signal input ends is designated as an added signal input end, one L6 or R2 of the separated signal output ends is designated as a dropped signal output end, and the separated signal output ends L5 and L7, or R1 and R3 except for the dropped signal output end connected to the signal input ends L1 and L3, or R5 and R7 at the same side. The WDM add/drop amplifier module 100 comprises a circulator 140L, 140R provided at both ends of 8×8 arrayed-waveguide grating 110 to distinguish paths of different WDMSs and to transmit through each path respectively, an unidirectional optical band pass filter 130L or 130R provided between the WDMS output end L8 or R8 of the 8×8 arrayed-waveguide grating 110 and the circulator 140L, 140R to eliminate a relative intensity noise, and a bidirectional signal amplifier 120L or 120R.

12 Claims, 5 Drawing Sheets

SIMPLE BIDIRECTIONAL ADD/DROP AMPLIFIER MODULE BASED ON A SINGLE MULTIPLEXER

BACKGROUND OF THE INVENTION

This invention relates to a bidirectional add/drop amplifier module, more specifically, to the bidirectional add/drop amplifier module that is simply constructed using a single bidirectional multiplexer such as an arrayed-waveguide grating.

This invention may be more clearly understood by referring to the cited papers, as follows:

F. Elrefaie, "Multiwavelength survivable ring network architectures", *International Conference on Communication*, 1993, paper 48.7; F. Shehadeh, R. S. Vodhanel, M. Krain, C. Gibbons, R. E. Wagner, and M. Ali, "Gain-equalized, eight-wavelength WDM optical add-drop multiplexer with an 8-dB dynamic range", *IEEE Photonics Technol. Lett.*, vol. 7, no. 9, pp. 1075–1077, September, 1995; K. P. Ho, S. K. Liaw, and C. Lin, "Performance of an eight-wavelength bidirectional WDM add/drop multiplexer with 80-Gbit/s capacity", *Optical Fiber Communication '97*, paper TuR1; J. L. Gimlett, and N. K. Cheung, "Effects of phase-to-intensity noise conversion by multiple reflections on gigabit-per-second DFB laser transmission systems", *J. Lightwave Technol.*, vol. 7, no. 6, pp. 888–895, June, 1989; N. Henmi, Y. Aoki, S. Fujita, Y. Sunohara, and M. Shikada, "Rayleigh scattering influence on performance of 10 Gb/s optical receiver with Er-doped optical fiber preamplifier," *IEEE Photonics Technol. Lett.*, vol. 2, no. 4, pp. 277–278, April, 1990; C. Barnard, J. Chrostowski, and M. Kavehrad, "Bidirectional fiber amplifiers," *IEEE Photonics Technol. Lett.*, vol. 4, no. 8, pp. 911–913, August, 1992; K. Kannan, and S. Frisken, "Unrepeatered bidirectional transmission system overa single fiber using optical fiber amplifiers," *IEEE Photonics Technol. Lett.*, vol. 5, no. 1, pp. 76–79, January, 1993; W. Y. Guo, and Y. K. Chen, "High-speed bidirectional four-channel optical FDM-NCFSK transmission using an $Er^{3+}$-doped fiber amplifier," *IEEE Photonics Technol. Lett.*, vol. 5, no. 2, pp. 232–235, February, 1993; Y. H. Cheng, N. Kagi, A. Oyobe, and K. Nakamura, "622 Mb/s, 144 km transmission using a bidirectional fiber amplifier repeater," *IEEE Photonics Technol. Lett.*, vol. 5, no. 3, pp. 356–358, March, 1993; R. J. Orazi, and M. N. McLandrich, "Bidirectional transmission at 1.55 microns using fused fiber narrow channel wavelength division multiplexers and erbium-doped fiber amplifier," *IEEE Photonics Technol. Lett.*, vol. 6, no. 4, pp. 571–574, April, 1994; M. O. van Deventer, and O. J. Koning, "Unimpaired transmission through a bidirectional erbium-doped fiber amplifier near lasing threshold," *IEEE Photonics Technol. Lett.*, vol. 7, no. 9, pp. 1078–1080, September, 1995M.; O. van Deventer, and O. J. Koning, "Bidirectional transmission using an erbium-doped fiber amplifier without optical isolators," *IEEE Photonics Technol. Lett.*, vol. 7, no. 11, pp. 1372–1374, November, 1995.

A wavelength division multiplexing (WDM) optical network uses different wavelengths to transmit a plurality of optical signals unconcernedly with any transmission mode and speed, whereby a super highway and wide area network can be realized. The network requires a drop function for receiving a wanted signal at each node and an add function for transmitting a wanted signal at each node. Therefore, a WDM add/drop multiplexer is an important constituent for constructing the WDM optical network. The add/drop multiplexer is especially emphasized in a WDM ring network.

In order to a bidirectional ring network using a unidirectional WDM add/drop multiplexer, at least two pairs of optical fiber are required. A bidirectional WDM add/drop multiplexer that can not only transmit but also add/drop a signal in bidirection is significantly reduce consumption of the optical fiber required in constructing the bidirectional ring network.

Such bidirectional WDM add/drop multiplexers are proposed in U.S. Pat. No. 5,548,438 issued Apr. 20, 1996 and entitled "Bidirectional optical amplifier", U.S. Pat. No. 5,633,741 issued May 27, 1997 and entitled "Multichannel optical fiber communications", and a paper of K. P. Ho, et al., "Performance of an eight-wavelength bidirectional WDM add/drop multiplexer with 80-Gbit capacity", Proceeding of Optical Fiber Communication, 1997.

These bidirectional WDM add/drop multiplexers, however, use a 1×N demultiplexer and an N×1 multiplexer, whereby their structures are very complicated and the manufacturing cost is very high.

SUMMARY OF INVENTION

This invention is aimed to obtain a bidirectional WDM add/drop amplifier module simply and inexpensively manufactured using a single N×N multiplexer.

The bidirectional WDM add/drop amplifier module according to this invention comprises bidirectional signal add/drop means using a single N×N multiplexer, and bidirectional signal amplifying means connected to the signal add/drop means in series.

The N×N multiplexer has a channel structure that comprises, at each side, a wavelength division multiplexed signal (WDMS) input end, a WDMS output end, at least two separated signal input ends, and at least two separated signal output ends. At least one of the separated signal input ends is designated as an added signal input end, while at least one of the separated signal output ends is designated as a dropped signal output end. The separated signal output ends except for the dropped signal output end are connected to the signal input ends at the same side.

The number of the separated signal output ends is preferably equaled to the number of the separated signal input ends, while the number of the separated signal input ends is preferably equaled to the number of the separated signal output ends.

According to the invention, the WDM add/drop amplifier module further comprises signal separating means provided at both ends of the bidirectional signal add/drop means to distinguish paths of different WDMSs and to transmit through each path respectively.

Preferably, a unidirectional optical band pass filter is provided between the WDMS output end of the N×N multiplexer and the signal separating means to eliminate a relative intensity noise.

The bidirectional signal amplifying means may be selected from a group of amplifiers consisting of an erbium doped fiber amplifier, praseodymium doped fiber amplifier and semiconductor optical amplifier, and assigned one by one end of the bidirectional signal add/drop means.

The N×N multiplexer may be an arrayed-waveguide grating.

A difference between the frequency of the added signal and the frequency of the dropped signal is preferred to be set into an amount of the free-spectral range of the arrayed-waveguide grating multiplied by integer comprising zero.

According to this invention, there is also provided a bidirectional signal add/drop apparatus for transmitting WDMS in bidirection and adding/dropping a signal using a single N×N multiplexer.

Other advantages and features of the present invention will become apparent from the following description, including the drawings and claims.

BRIEF DESCRIPTION OF THE SEVERAL VIEWS OF THE DRAWINGS

The foregoing summary, as well as the following detailed description of the invention will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

Figure 1:
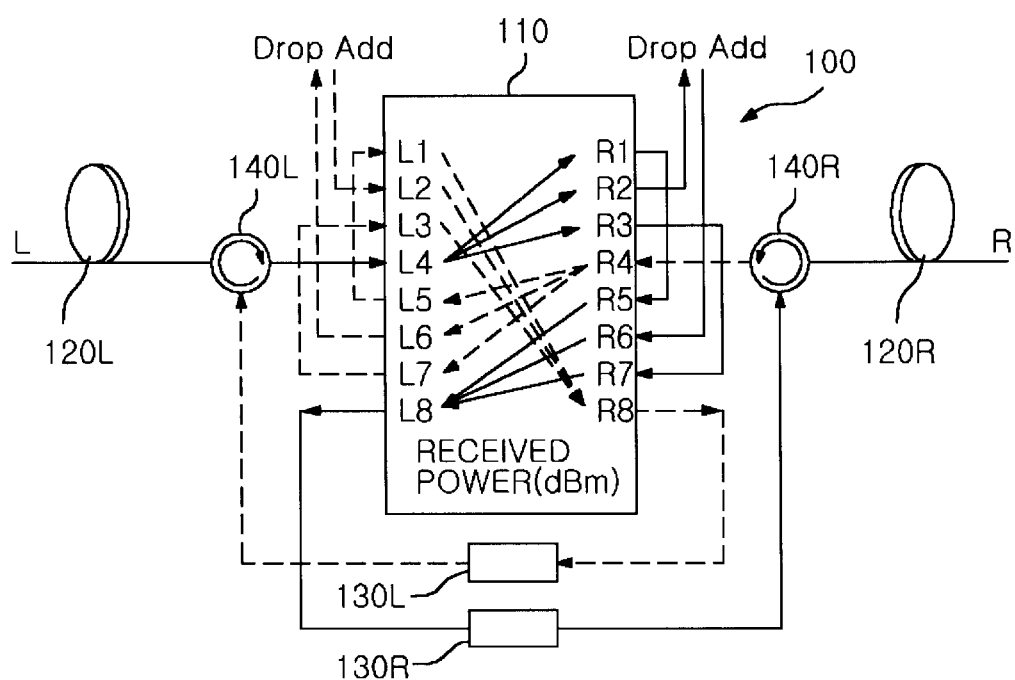
FIG. 1 shows a map for explaining signal flow in an embodiment of the bidirectional WDM add/drop amplifier module according to this invention.

The WDM add/drop amplifier module 100 showed in FIG. 1 is designed using an 8×8 arrayed-waveguide grating 110 to transmit a wavelength division multiplexed signal in bidirection, and to add/drop a signal in bidirection.

The WDM add/drop amplifier module 100 according to this embodiment, a wavelength division multiplexed signal transmitted from the left side L is inputted to a left channel end L4 of the 8×8 arrayed-waveguide grating 110. Then, the wavelength division multiplexed signal is demultiplexed into three separated signals that are outputted at three right channel ends R1, R2 and R3. A separated signal outputted at a right channel end R2 is dropped, while two separated signals outputted at two right channel ends R1 and R3 are inputted to other two right channel ends R5 and R7, and then, outputted at a left channel end L8 in a WDMS. A signal having same wavelength with the wavelength of the signal dropped at the right channel end R2 can be added to a right channel end R6.

Another wavelength division multiplexed signal transmitted from the right side R is inputted to a right channel end R4 of the 8×8 arrayed-waveguide grating 110. Then, the wavelength division multiplexed signal is demultiplexed into three separated signals that are outputted at three left channel ends L5, L6 and L7. A separated signal outputted at a left channel end L6 is dropped, while two separated signals outputted at two left channel ends L5 and L7 are inputted to other two left channel ends L1 and L3, and then, outputted at a right channel end R8 in a WDMS. A signal having wavelength same with the wavelength of the signal dropped at the left channel end L6 can be added to a left channel end L2.

Two amplifiers 120L and 120R provided at both ends of the 8×8 arrayed-waveguide grating 110 amplify an inputted/outputted WDMS, and two circulators 140L and 140R distinguish an inputted WDMS and an outputted WDMS from each other to transmit through each path. The amplifier 120L or 120R may be an erbium doped fiber amplifier, praseodymium doped fiber amplifier or semiconductor optical amplifier.

The bidirectional optical transmission system creates a relative intensity noise because of a Rayleigh backscattering signal, optical reflection and so forth. If a wavelength multiplexer is used, another relative intensity noise due to a crosstalk is created. In this embodiment, any relative intensity noise is eliminated by optical band pass filters 130L and 130R. That is, a WDMS at an output end L8 or R8 of the 8×8 arrayed-waveguide grating 110 passes the optical band pass filter 130L or 130R before inputted to the circulator 140L or 140R to eliminate any signal progressing in the reverse direction so that the relative intensity noise is attenuated. The optical band pass filter 130L and 130R allows a signal in one direction to pass but inhibits to pass a signal in the other direction.

Figure 2:
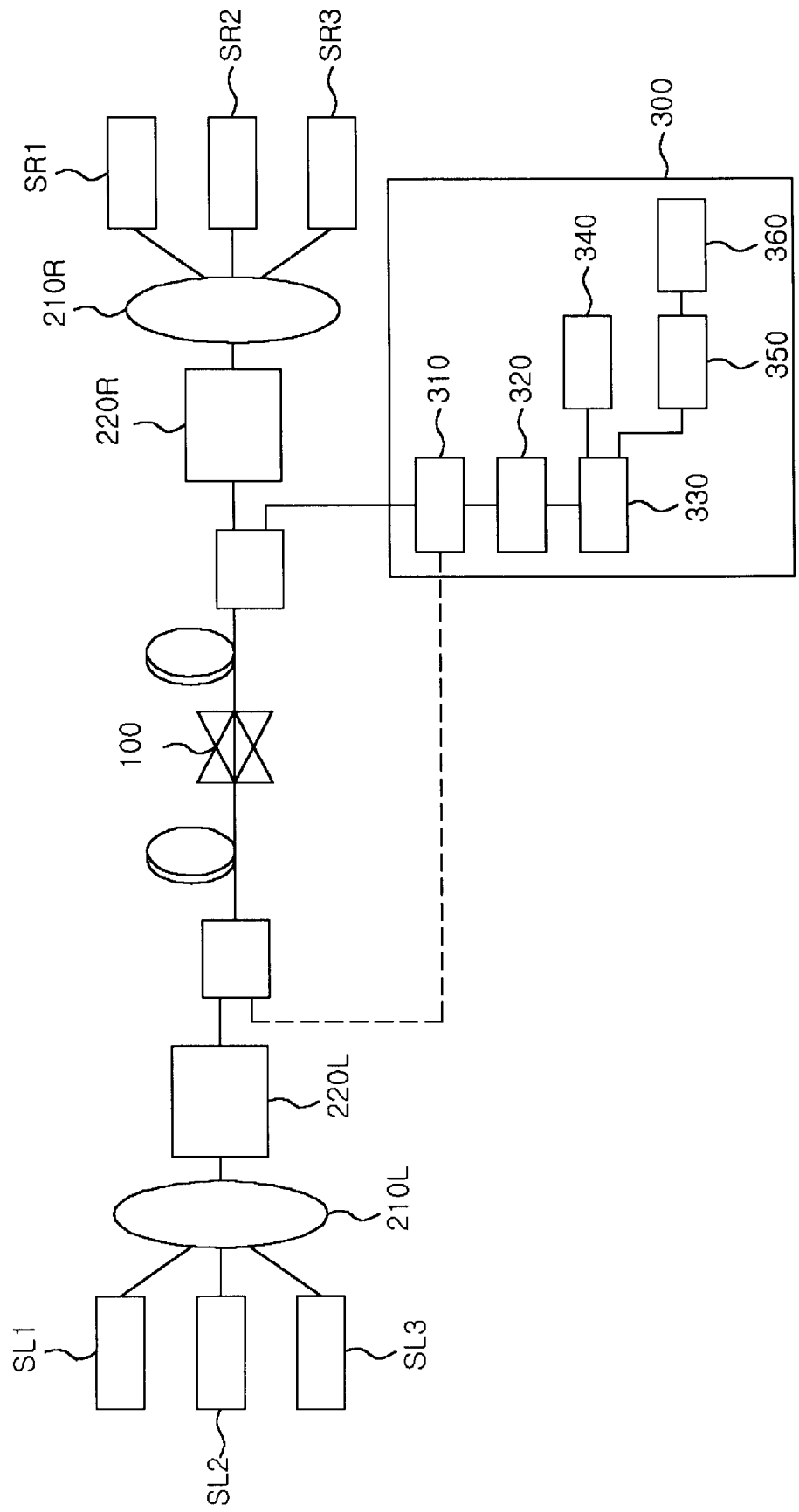
FIG. 2 shows a block diagram for explaining a bidirectional optical transmission system constructed using the bidirectional WDM add/drop amplifier module showed in FIG. 1.

In order to test performance of the bidirectional WDM add/drop amplifier module according to this invention, a bidirectional optical transmission system showed in FIG. 2 was constructed. A WDM add/drop amplifier module 100 of the bidirectional optical transmission system was made from a 8×8 arrayed-waveguide grating 110 having a channel spacing of 200 GHz and an insertion loss of about 6 dB per a connection. Circulators 140L and 140R had three ports and an insertion loss of about 1 dB respectively. Optical band pass filters 130L and 130R should have a pass band of more than 3.2 nm for three signals having a spacing of 200 GHz (1.6 nm) to be passed. The optical band pass filters 130L and 130R used in this test had a bandwidth of 10 nm in a 3-dB band and an insertion loss of about 1.5 dB. Optical amplifiers 120L and 120R made from an erbium-doped fiber of 12 m and were pumped using a pump laser of 980 nm. The bidirectional WDM add/drop amplifier module as aforementioned had a signal gain of about 20 dB (@ input power=−20 dBm/channel) and a noise figure of about 5 dB.

As showed in FIG. 2, each of three signals SL1, SL2 and SL3 transmitted from the left of the WDM add/drop amplifier module 100 was a DFB laser signal having wavelengths of 1555.75 nm, 1557.36 nm and 1558.98 nm respectively, while each of three signals SR1, SR2, SR3 transmitted from the right of the WDM add/drop amplifier module 100 was a DFB laser signal having wavelengths of 1552.6 nm, 1554.2 nm and 1557 nm respectively.

The three signals SL1, SL2 and SL3 were multiplexed into a WDMS using a coupler 210L, and modulated to 2.5 Gb/s using LiNbO$_3$ modulator 220L. After passing a single mode optical fiber of 40 Km, the WDMS is amplified by the WDM add/drop amplifier module 100 according to this invention. After passing an additive single mode optical fiber of 20 Km, the WDMS was inputted to an optical receiver 300 that is used for measuring performance of the bidirectional optical transmission system in this test. The optical receiver 300 comprises an optical band pass filter 310, an optical attenuator 320, a 90:10 coupler 330, a power meter 340, an ADP receiver 350 and a bit error rate tester 360.

Figure 3:
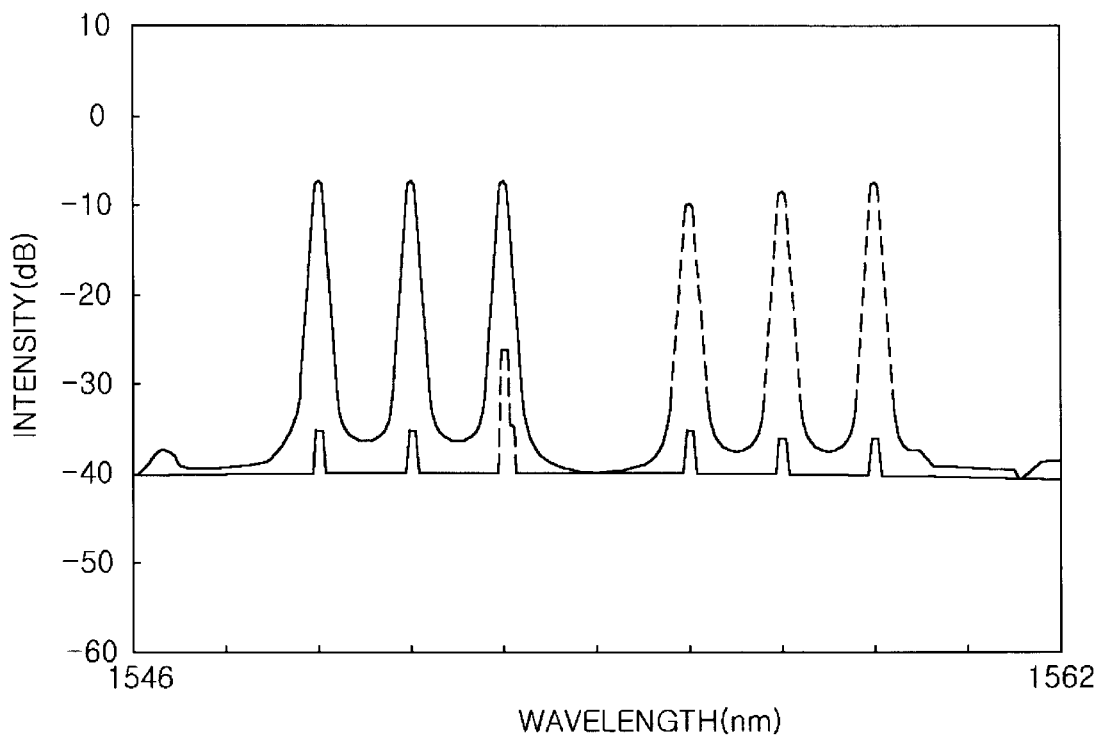
FIG. 3 shows an optical spectrum of WDMS passed the bidirectional WDM add/drop amplifier module showed in FIG. 1.

Referring to FIG. 3, an optical spectrum of a WDMS received by the optical spectrum analyzer shows not only a signal separated into three wavelengths but also a signal in the reverse direction due to Rayleigh backscattering and optical reflection. It is able to eliminate the signal in the reverse direction by a band pass filter having an appropriate pass band.

The WDMS received by the optical receiver 310 was demultiplexed by using the optical band pass filter 330.

Figure 4:
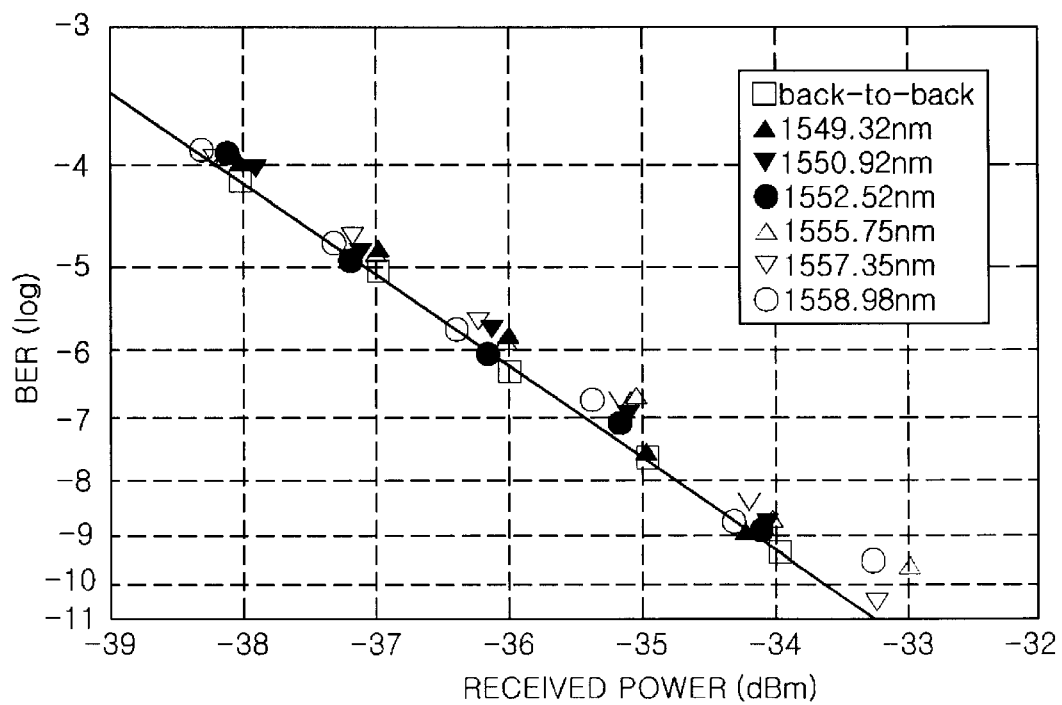
FIG. 4 shows a graph in which bit error rate of signals transmitted through the bidirectional optical transmission system showed in FIG. 2 in received power.

Bit error rate of the demultiplexed signals SL1, SL2 and SL3 or SR1, SR2 and SR3 measured using the bit error rate tester 360 are showed in FIG. 4. Referring FIG. 4 showing the bit error rate of each signal in received power, all of the measured signals have a receiver sensitivity of about −34 dBm for a bit error rate of $10^{-9}$ with no penalty. It means that a relative intensity noise such as Rayleigh backscattering signal created in the optical fiber is substantially eliminated by the optical band pass filter 130L and 130R.

Figure 5A:
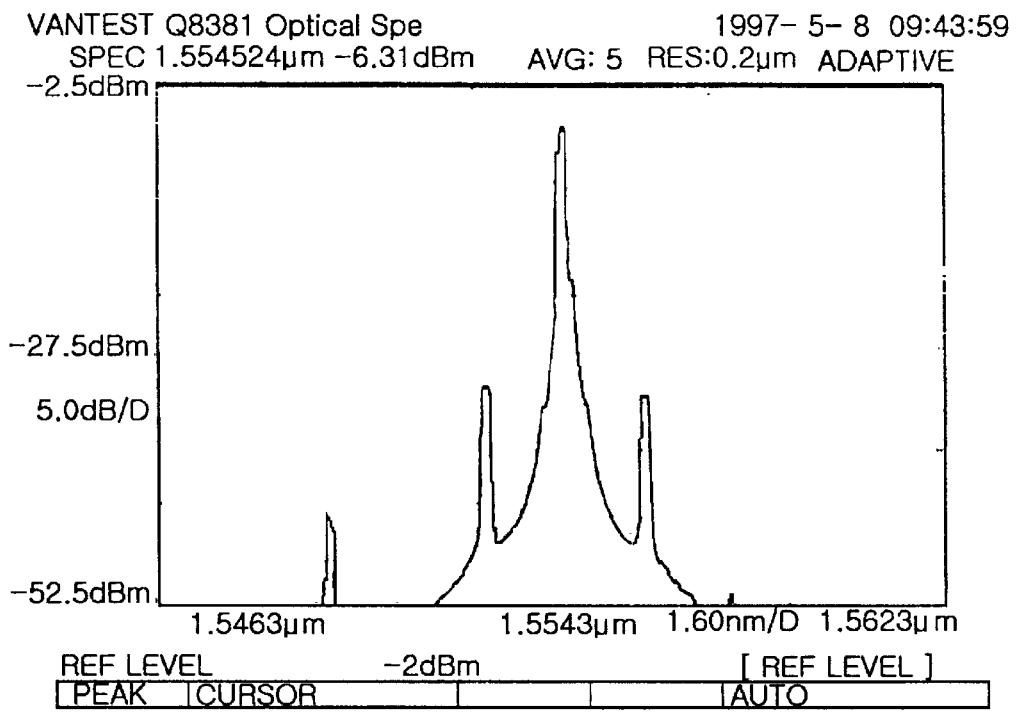
FIG. 5A shows a spectrum of a signal dropped from the bidirectional WDM add/drop amplifier module showed in FIG. 1.
Figure 5B:
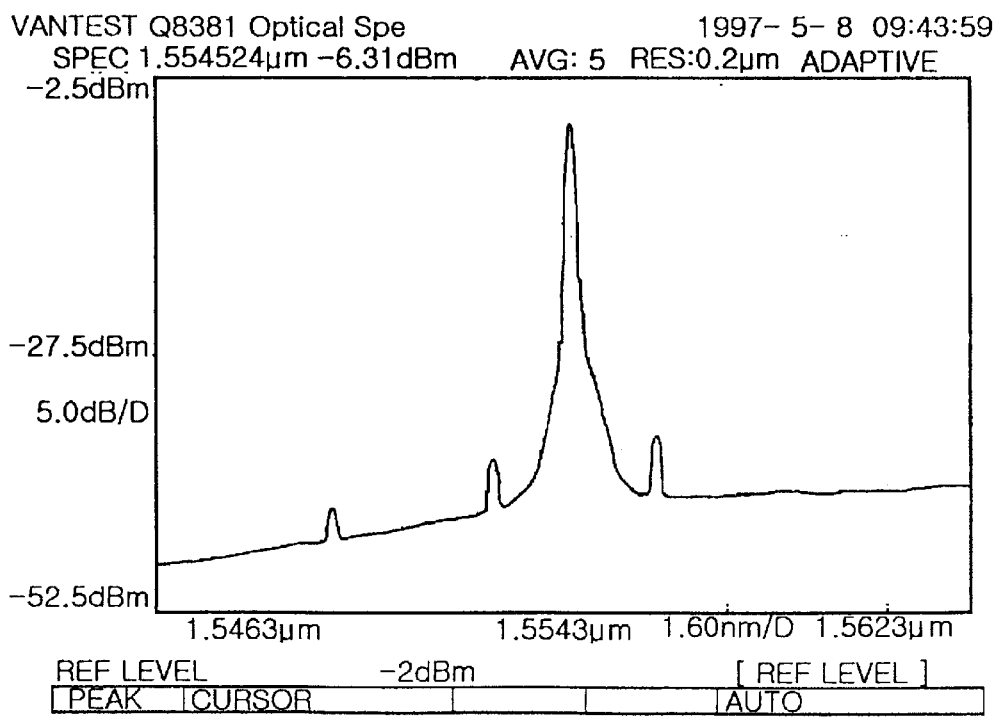
FIG. 5B shows a spectrum of a signal added to the bidirectional WDM add/drop amplifier module showed in FIG. 1.

In order to inspect add/drop function of the WDM add/drop amplifier module 100 according to this invention, a signal SR2 among the signals inputted at the right of the bidirectional optical transmission system 200 is dropped at a left channel end L6 of the 8×8 arrayed-waveguide grating 110 of the WDM add/drop amplifier module 100 and analyzed using a spectrum showed in FIG. 5A. Furthermore, a signal added to another left channel end L2 of the 8×8 arrayed-waveguide grating 110 which has same wavelength with the wavelength of the dropped signal is analyzed using a spectrum showed in FIG. 5B. Referring FIG. 5A and FIG. 5B, the dropped signal has a signal power of about −6 dBm, while the added signal has a similar power.

Figure 6:
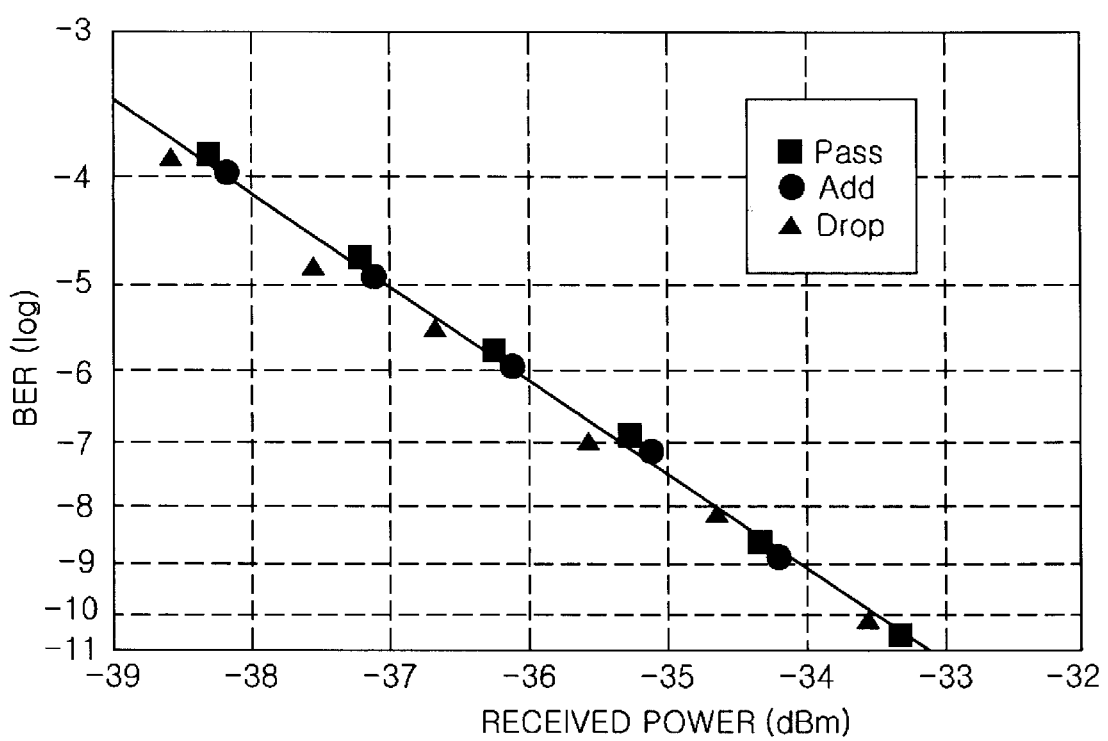
FIG. 6 shows a graph in which bit error rate of signals showed in FIG. 5A and FIG. 5B in receiving power.

As can be seen from FIG. 6 that shows bit error rate of the added signal, the dropped signal and the passed signals in received power, the added and dropped signals as well as the passed signals have no penalty in receiver sensitivity. Therefore, it is apparent that the WDM add/drop amplifier module according to this invention is proper not only to amplify a signal but also add/drop a signal.

Although the above detailed explanation for the present invention is relied on several preferred embodiments, these are not for limiting but for exemplifying the present invention. Variable alterations, changes or modulations within the technical idea of the present invention will be apparent to one skilled in this technical field.

What is claimed is:

1. A bidirectional wavelength division multiplexing (WDM) add/drop amplifier module for transmitting a wavelength division multiplexed signal (WDMS) in both forward and reverse directions and for adding/dropping a signal in both the forward and the reverse directions at each node in a WDM network system, the WDM module comprising:

bidirectional signal add/drop means using a single N×N multiplexer; and bidirectional signal amplifying means connected to said signal add/drop means in series, wherein said N×N multiplexer has a channel structure that comprises, at each side, a WDMS input end, a WDMS output end, at least two separated signal input ends, and at least two separated signal output ends, at least one of said separated signal input ends being designated as an added signal input end, and at least one of said separated signal output ends being designated as a dropped signal output end, said separated signal output ends, except for said dropped signal output end, being connected to said separated signal input ends at the same side.

2. A bidirectional WDM add/drop amplifier module according to claim 1, wherein the number of said separated signal output ends preferably equals the number of said separated signal input ends, while the number of said added signal input ends preferably equals the number of said dropped signal output ends.

3. A bidirectional WDM add/drop amplifier module according to claim 2, wherein said N×N multiplexer comprises an 8×8 arrayed-waveguide grating having, at each side, a WDMS input end, a WDMS output end, three separated signal input ends, and three separated signal output ends, one of said separated signal input ends being designated as the added signal input end, and one of said separated signal output ends being designated as the dropped signal output end, said separated signal output ends, except for said dropped signal output end, being connected to said separated signal input ends at the same side.

4. A bidirectional WDM add/drop amplifier module according to claim 1, wherein said WDM add/drop amplifier module further comprises signal separating means provided at both ends of said bidirectional signal add/drop means to distinguish paths of different WDMSs and to transmit through each path respectively.

5. A bidirectional WDM add/drop amplifier module according to claim 4, wherein said WDM add/drop amplifier module further comprises an unidirectional optical band pass filter provided between said WDMS output end of said N×N multiplexer and said signal separating means to eliminate a relative intensity noise.

6. A bidirectional WDM add/drop amplifier module according to claim 1, wherein said bidirectional signal amplifying means is selected from a group of amplifiers consisting of an erbium doped fiber amplifier, praseodymium doped fiber amplifier and semiconductor optical amplifier, and assigned one by one end of said bidirectional signal add/drop means.

7. A bidirectional WDM add/drop amplifier module according to claim 3, wherein a difference between the frequency of the added signal and the frequency of the dropped signal is set into an amount of the free-spectral range of the arrayed-waveguide grating multiplied by integer comprising zero.

8. A bidirectional signal add/drop apparatus for transmitting a a wavelength division multiplexed signal (WDMS) in both forward and reverse directions and for adding/dropping a signal in both the forward and the reverse directions at each node in a wavelength division multiplexing (WDM) network system, comprising:

an N×N multiplexer having a channel structure that comprises, at each side, a WDMS input end, a WDMS output end, at least two separated signal input ends, and at least two separated signal output ends, at least one of said separated signal input ends being designated as an added signal input end, and at least one of said separated signal output ends being designated as a dropped signal output end, said separated signal output ends, except for said dropped signal output end, being connected to said separated signal input ends at the same side.

9. A bidirectional signal add/drop apparatus according to claim 8, wherein the number of said separated signal output ends preferably equals the number of said separated signal input ends, while the number of said added signal input ends preferably equals the number of said dropped signal output ends.

10. A bidirectional signal add/drop apparatus according to claim 9, wherein said N×N multiplexer comprises an 8×8 arrayed-waveguide grating having, at each side, a WDMS input end, a WDMS output end, three separated signal input ends, and three separated signal output ends, one of said separated signal input ends being designated as the added signal input end, and one of said separated signal output ends being designated as the dropped signal output end, said separated signal output ends, except for said dropped signal output end, being connected to said separated signal input ends at the same side.

11. A bidirectional signal add/drop apparatus according to claim 8, wherein said signal add/drop apparatus further comprises signal separating means provided at both ends to distinguish paths of different WDMSs and to transmit through each path respectively.

12. A bidirectional signal add/drop apparatus according to claim 11, wherein a difference between a frequency of the added signal and a frequency of the dropped signal is set into an amount of the free-spectral range of the arrayed-waveguide grating multiplied by an integer comprising zero.

\* \* \* \* \*